United States Patent
Yeh et al.

(10) Patent No.: US 11,415,305 B2
(45) Date of Patent: Aug. 16, 2022

(54) SENSING FOR CONTROLLING LUMINAIRES

(71) Applicant: SIGNIFY HOLDING B.V., Eindhoven (NL)

(72) Inventors: Chienliang Yeh, Yilan (TW); Xiaoyin Li, Shanghai (CN)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 17/439,676

(22) PCT Filed: Mar. 25, 2020

(86) PCT No.: PCT/EP2020/058343
§ 371 (c)(1),
(2) Date: Sep. 15, 2021

(87) PCT Pub. No.: WO2020/200954
PCT Pub. Date: Oct. 8, 2020

(65) Prior Publication Data
US 2022/0163192 A1    May 26, 2022

(30) Foreign Application Priority Data

Mar. 29, 2019 (WO) ................. PCT/CN2019/080557
Jun. 6, 2019 (EP) ..................................... 19178745

(51) Int. Cl.
*F21V 23/00* (2015.01)
*F21V 23/04* (2006.01)
*F21Y 115/10* (2016.01)

(52) U.S. Cl.
CPC ........ *F21V 23/005* (2013.01); *F21V 23/0464* (2013.01); *F21V 23/0471* (2013.01); *F21Y 2115/10* (2016.08)

(58) Field of Classification Search
CPC .. F21V 23/005; F21V 23/0442; F21V 23/045; F21V 23/0457; F21V 23/0464; F21V 23/0471; F21V 23/0478
See application file for complete search history.

(56) References Cited

U.S. PATENT DOCUMENTS 9,163,814 B2   10/2015 Plunk et al.
9,534,771 B2    1/2017 Wu et al.
(Continued)

FOREIGN PATENT DOCUMENTS

CN        109073208 A    12/2018
DE     102015114842 A1    3/2017
(Continued)

*Primary Examiner* — Bryon T Gyllstrom
*Assistant Examiner* — Christopher E Dunay

(57) ABSTRACT

A luminaire assembly kit, a luminaire and a luminaire installation including a sensor strip (30) comprising a flexible printed circuit board (31) having opposing major surfaces (32, 33) and a plurality of conductive tracks (34) embedded in the flexible printed circuit board (31); a sensor (20); and a driver (22) for said sensor (20). The sensor (20) and the driver (22) are conductively coupled to each other through at least some of said conductive tracks (34) and are mounted on one of said major surfaces (32, 33) at opposing ends of the flexible printed circuit board (31). The luminaire assembly kit or luminaire further comprises a light transmissive body and a frame (11). During assembly a section of the flexible printed circuit board (31) is wrapped around an edge (15) of the light transmissive body such that it is located in between the frame (11) and the light transmissive body.

15 Claims, 4 Drawing Sheets

(56) References Cited

U.S. PATENT DOCUMENTS

| | | | |
|---|---|---|---|
| 9,690,032 B1* | 6/2017 | Nichol | G02B 6/0045 |
| 10,605,436 B1* | 3/2020 | Irizarry | G02B 6/0088 |
| 11,054,116 B1* | 7/2021 | Lan | F21S 8/026 |
| 2006/0109395 A1* | 5/2006 | Yamamoto | G02B 6/005 |
| | | | 349/58 |
| 2008/0084520 A1* | 4/2008 | Nam | G02B 6/0068 |
| | | | 445/24 |
| 2009/0167675 A1 | 7/2009 | Park et al. | |
| 2010/0327766 A1 | 12/2010 | Recker et al. | |
| 2013/0242600 A1* | 9/2013 | Franklin | G06Q 20/204 |
| | | | 362/602 |
| 2015/0219825 A1 | 8/2015 | Wu et al. | |
| 2016/0198560 A1* | 7/2016 | Shin | H05K 1/147 |
| | | | 361/749 |
| 2017/0167670 A1 | 6/2017 | Aliakseyeu et al. | |
| 2017/0262026 A1* | 9/2017 | Jin | G01S 17/08 |
| 2017/0363800 A1* | 12/2017 | Liu | G02F 1/13318 |
| 2018/0157093 A1* | 6/2018 | Jang | H05K 1/144 |
| 2018/0238535 A1 | 8/2018 | Goerz et al. | |
| 2019/0150766 A1 | 5/2019 | Gourlay et al. | |
| 2019/0212788 A1* | 7/2019 | Kwak | G06F 3/041 |
| 2019/0278411 A1* | 9/2019 | Jeon | G02B 5/3025 |
| 2019/0342975 A1* | 11/2019 | Diana | F21V 29/70 |
| 2021/0034182 A1* | 2/2021 | Zheng | G02F 1/13338 |
| 2021/0055471 A1* | 2/2021 | Xiang | G02B 6/009 |
| 2022/0066230 A1* | 3/2022 | Chang | H04N 5/2253 |

FOREIGN PATENT DOCUMENTS

| | | |
|---|---|---|
| EP | 2644975 A1 | 10/2013 |
| EP | 3449181 A1 | 3/2019 |
| JP | 2003141926 A | 5/2003 |
| JP | 2010165581 A | 7/2010 |
| JP | 2012185242 A | 9/2012 |
| JP | 2017043530 A | 3/2017 |
| KR | 1020080098265 A | 11/2008 |
| WO | 2017187204 A1 | 11/2017 |

* cited by examiner

SENSING FOR CONTROLLING LUMINAIRES

CROSS-REFERENCE TO PRIOR APPLICATIONS

This application is the U.S. National Phase application under 35 U.S.C. § 371 of International Application No. PCT/EP2020/058343, filed on Mar. 25, 2020, which claims the benefits of European Patent Application No. 19178745.6, filed on Jun. 6, 2019 and Chinese Patent Application No. PCT/CN2019/080557, filed on Mar. 29, 2019. These applications are hereby incorporated by reference herein.

FIELD OF THE INVENTION

The present invention relates to a sensor strip for a luminaire comprising a flexible printed circuit board having a plurality of conductive tracks embedded in the flexible printed circuit board, a sensor and a driver for said sensor, wherein the sensor and the driver are conductively coupled to each other through at least some of said conductive tracks.

The present invention further relates to a luminaire assembly kit comprising such a sensor strip.

The present invention still further relates to a luminaire comprising such a sensor strip.

The present invention still further relates to a luminaire installation comprising such a sensor strip.

The present invention still further relates to a luminaire assembly method comprising the use of such a sensor strip.

BACKGROUND OF THE INVENTION

Nowadays, there is a clear desire to reduce the electricity used by luminaires such as to reduce their energy consumption. Several strategies are being deployed to achieve this objective. For instance, the introduction of solid state lighting, e.g. LEDs, facilitates the reduction of such energy consumption as the energy consumption of a typical LED is around 80-90% less than the incandescent lumen equivalent of such as solid state lighting element. In addition, sensor technology may be added to luminaires to offer lighting on demand, such that the luminaires are only switched on when needed, thereby further reducing their energy consumption.

It is known to add a sensor to a luminaire in order to control the operation of the luminaire. For example, the sensor may be a motion sensor such as a passive infrared (PIR) sensor, camera sensor or the like, such that upon detection of a presence with the motion sensor, the luminaire is switched on. In another example, the sensor may be an ambient light sensor such that the luminaire is switched on upon the sensed light levels falling below a defined threshold. Typically, the power supply to the one or more light sources of the luminaire is directly or indirectly controlled by such a sensor, e.g. by the driver of the one or more light sources being responsive to the sensor, such that upon detection of a certain trigger for the sensor, the resulting sensor signal activates the driver of the one or more light sources, which causes the one or more light sources to be switched on. An example of such an arrangement can be found in US 2013/0207552 A1, which discloses a sensor system electrically connected to and controlling at least one recessed luminaire. The sensor system housing is externally connected to the luminaire and includes a flexible member projecting therefrom. The flexible member supports detection electronics spaced from the sensor system housing or the coupled light fixture and sensor system housings. The flexible member allows a sensor to be horizontally and vertically positioned relative to the sensor system housing.

A problem associated with the integration of such sensor functionality in a luminaire is schematically depicted in FIG. 1, which shows a perspective view of part of a luminaire 1, here comprising a light panel 10, and FIG. 2, which depicts a cross-sectional view of the luminaire 1. In order to install a sensor 20 such as a motion sensor or ambient light sensor in the light panel 10, an opening 18 has to be made through the light panel 10, typically proximal to the frame 11 around the light panel 10, such that the sensor 20 can be housed in the luminaire 1. The sensor 20 typically is electrically connected by a connection arrangement 24 extending through the light panel 10 to the sensor driver 22. One or more light sources 25 of the luminaire 1, e.g. one or more solid state lighting elements, may be arranged along an edge of the light panel 10 in between the frame 11 and the light panel 10 such that the light emitted by the one or more light sources 25 can be coupled into light panel 10, such as into a light guide 14 of the light panel 10. The light guide 14 may be sandwiched between a reflective layer 16 and a diffuser 12 to control the optical performance of the luminaire 1. The diffuser 12 may act as the light exit window 13 of the luminaire 1. In order to prevent light travelling through the light panel 10 from leaking out of the light panel 10 around the edge(s) of the opening 18, a light blocking member 26 typically has to be arranged in between the light panel 10 and the sensor 20 that extends beyond the edge(s) of the opening 18.

In summary, the installation of such a sensor 20 with the luminaire 1 has a number of drawbacks. Firstly, the installation requires the light panel 10 to be opened, which adds a complex process step to the production of the luminaire 1. In addition, an additional light blocking member 26 is required to safeguard the optical performance of the luminaire 1, which adds to the overall cost of the luminaire.

US 20180238535A1 discloses a film-like lighting device for mounting on walls, ceilings, floors and the like has at least one film element and a plurality of light-emitting diodes integrated into the film element and/or laser beam-generating devices which are operatively connected to a control unit and can be controlled individually or in groups by means of the control unit.

US 20170167670A1 discloses one or more signals indicative of a shape formed by a flexible lighting strip may be obtained, e.g., from one or more sensors (110) secured to the flexible lighting strip. One or more deformations in the flexible lighting strip may be detected based on the one or more signals.

US 20190150766A1 discloses a modular light panel that comprises a transparent base substrate, upon a first surface of which is mounted an array of light sources, and a transparent protecting layer arranged to encapsulate the light sources upon the first surface.

US 20150219825A1 discloses an edge-fed waveguide luminaire includes a light waveguide having a planar body, a waveguide edge support structure, and an anchor opening in the planar body of the light waveguide, which is displaced from said waveguide edge support structure. A sensor is fixed in the anchor opening of said light waveguide so as to be responsive to conditions in the space below the luminaire.

EP 2644975A1 discloses a lamp has lamp housing that is provided to receive a lighting unit. A partially transparent cover is provided to close the lamp housing. The cover is provided with opening that is used for receiving the replaceable electrical structures such as sensor e.g. light sensor or motion sensor or LED.

KR1020080098265A discloses an illumination block is provided to reduce energy consumption due to housing and maintain constant illumination effect by forming light-transmission region on the upper side of the illumination.

SUMMARY OF THE INVENTION

The present invention seeks to provide a sensor strip for a luminaire that can be used in conjunction with such a luminaire without having to open up the luminaire and without requiring a light blocking member for its installation.

The present invention further seeks to provide a luminaire assembly kit with such a sensor strip in which the luminaire can be assembled without having to open up the luminaire and without having to use such a light blocking member.

The present invention still further seeks to provide a luminaire comprising such a sensor strip.

The present invention still further seeks to provide a luminaire installation comprising such a sensor strip.

The present invention still further seeks to provide a luminaire assembly method using such a sensor strip.

According to an aspect, there is provided a sensor strip for a luminaire, the sensor strip comprising a flexible printed circuit board having opposing major surfaces and a plurality of conductive tracks embedded in the flexible printed circuit board; a sensor; and a driver for said sensor, wherein the sensor and the driver are conductively coupled to each other through at least some of said conductive tracks and are mounted on one of said major surfaces at opposing ends of the flexible printed circuit board. The present invention is based on the insight that the provision of a sensor strip in which the sensor, e.g. a motion sensor or ambient light sensor, and its driver are each mounted on a major surface of the flexible printed circuit board of such a sensor strip, such a sensor strip may be wrapped around the edge of a light panel, thereby obviating the need to open up the light panel and the need to use a light blocking element to prevent light from leaking from the light panel at such an opening. Therefore, such a sensor strip simplifies the manufacture and installation of a sensor with luminaires, including but not limited to luminaires including light panels.

In the context of the present application, it should be understood that the phrase "the sensor and the driver are conductively coupled to each other through at least some of said conductive tracks and are mounted on one of said major surfaces at opposing ends of the flexible printed circuit board" does not necessarily imply that the sensor and/or the driver are mounted at opposing edges of the flexible printed circuit board. For instance, further elements, such as electrical contacts, may be present in between the sensor or the driver and the edge of the flexible printed circuit board proximal to the sensor or driver. Where reference is made to the sensor and driver being mounted at opposing ends of the flexible printed circuit board, this means that the majority of the length of the flexible printed circuit board is located in between the sensor and the driver.

In a preferred embodiment, the sensor is a motion sensor such as a PIR sensor or an ambient light sensor.

In an embodiment, the sensor and the driver are mounted on the same major surface of the flexible printed circuit board. Such a sensor strip for example may be used in a scenario in which the driver and sensor are to be mounted on opposing major panel surfaces of the light panel of a luminaire.

In an alternative embodiment, the sensor and the driver are mounted on opposing major surfaces of the flexible printed circuit board. Such a sensor strip for example may be used in a scenario in which the driver is to be mounted on a major panel surface of the light panel of a luminaire and the sensor is to be mounted on a frame of the luminaire or a ceiling element for mounting the luminaire.

In the sensor strip according to embodiments of the present invention, the flexible printed circuit board may have a thickness not exceeding 0.5 mm and preferably not exceeding 0.2 mm such that the sensor strip can be easily fitted in between a light panel and frame of a luminaire.

In the sensor strip according to embodiments of the present invention, the flexible printed circuit board may have a length of at least 50 mm to facilitate the sensor strip being wrapped around the light panel of a luminaire.

According to another aspect, there is provided a luminaire assembly kit comprising a light transmissive body, a frame comprising at least one frame element for fitting around an edge of the light transmissive body and the sensor strip of any of the herein described embodiments, wherein the frame is dimensioned such that the frame fits around said edge with a section of the flexible printed circuit board wrapped around said edge in between the light exit window and the frame. Such a luminaire assembly kit facilitates the assembly of a luminaire including a sensor such as a motion sensor or ambient light sensor without the need to open up the luminaire for the installation of the sensor.

The light transmissive body may comprise a light panel, which may be a laminate panel comprising a light guide layer in between a reflector layer and a diffuser layer. This provides a light panel with particularly good optical performance.

The luminaire assembly kit may further comprise at least one light source, e.g. for injecting its luminous output into said edge of the light panel. Such a light source preferably is a solid state element such as a LED, in order to limit the energy consumption of the luminaire and increase its operational life span and robustness.

According to yet another aspect, there is provided a luminaire comprising a light transmissive body, a frame arranged around at least one edge of the light transmissive body; at least one light source arranged to generate a luminous output through the light exit window; and the sensor strip of any of the herein described embodiments, wherein a first section of the flexible printed circuit board carrying the driver is hidden from view behind the light transmissive body; an intermediate section of the flexible printed circuit board in between the first section and a second section carrying the sensor is wrapped around an edge of the at least one edge of the light transmissive body such that this intermediate section is located in between the frame and the light transmissive body; and the second section carrying the sensor extends beyond the frame in front of the light transmissive body. Such a luminaire benefits from the presence of a sensor for controlling the luminaire without such a sensor requiring to be mounted through the light exit window, such that the complexity of the manufacturing and assembly process as well as the cost of such a luminaire is reduced. In the context of the present application, where reference is made to the driver being hidden from view, behind the light transmissive body, this is to be understood as the driver being not (clearly) visible to an observer of the luminaire when the luminaire is in normal use. For example, in case of the luminaire comprising a closed housing in part delimited by the light transmissive body, this may mean that the driver is located within this housing. In case of an open luminaire, i.e. without a closed housing, this may mean that the driver is located proximal to a further surface of the light transmissive body opposing its light exit surface. To this end, the light transmissive body preferably is non-transparent. Furthermore, where reference is made to a light transmissive body, such a body typically comprises a light entry surface, a light exit surface and a light path between the light entry surface and the light exit surface, but the light entry surface and the light exit surface do not require to be opposing surfaces. For example, in a preferred embodiment, the light transmissive body comprises a light panel having a first major panel surface acting as a light exit window, a second major panel surface opposing the first major panel surface and said at least one edge extending from the first major panel surface to the second major panel surface, wherein the frame is arranged around the at least one edge securing the light panel; the at least one light source is arranged to inject its luminous output into the light panel via an edge of the at least one edge; and the first section of the flexible printed circuit board carrying the driver is attached to the second major panel surface. In such an arrangement the at least one edge may act as the light entry surface of the light transmissive body.

The second section of the flexible printed circuit board carrying the sensor may be attached to the first major panel surface, such as adjacent to, e.g. abutting, the frame. Alternatively, the second section of the flexible printed circuit board carrying the sensor may be attached to the frame, which means that part of the light exit surface of the luminaire is not obscured by the sensor, thereby somewhat improving optical efficiency, as well as appearance of the luminaire.

Each of the first section and the second section of the flexible printed circuit board may be mounted on its receiving surface in any suitable manner, such as through adhesion. In a particularly preferred embodiment, the first section and/or the second section of the flexible printed circuit board are attached to their respective receiving surfaces with double-sided adhesive tape.

According to still another aspect, there is provided a luminaire installation comprising the luminaire according to an embodiment mounted in a support frame attached to an installation surface, wherein the second section of the flexible printed circuit board carrying the sensor is attached to the support frame. This for instance is advantageous where the mounting of the sensor on the light exit window of the luminaire is not preferred, and the frame of the luminaire is insufficiently exposed in the support frame to allow mounting of the sensor on this frame.

According to still another aspect, there is provided a method of assembling a luminaire from the luminaire assembly kit comprising a light panel of any of the herein described embodiments, the method comprising attaching a first section of the flexible printed circuit board carrying the driver to a major panel surface of the light panel opposing a light exit surface of the light panel; wrapping an intermediate section of the flexible printed circuit board in between the first section and a second section carrying the sensor around an edge of the light panel; and clamping the light panel in the frame such that the intermediate section of the flexible printed circuit board is located in between said edge and the frame. The assembly of such a luminaire in such a manner has the advantage that the sensor does not have to be mounted through the luminaire, thereby simplifying the assembly process and cost of the luminaire, as a light blocking element for preventing light leaking from such a mounting opening through the luminaire is not required.

The method may further comprise attaching the second section of the flexible printed circuit board to the light exit surface of the light panel.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
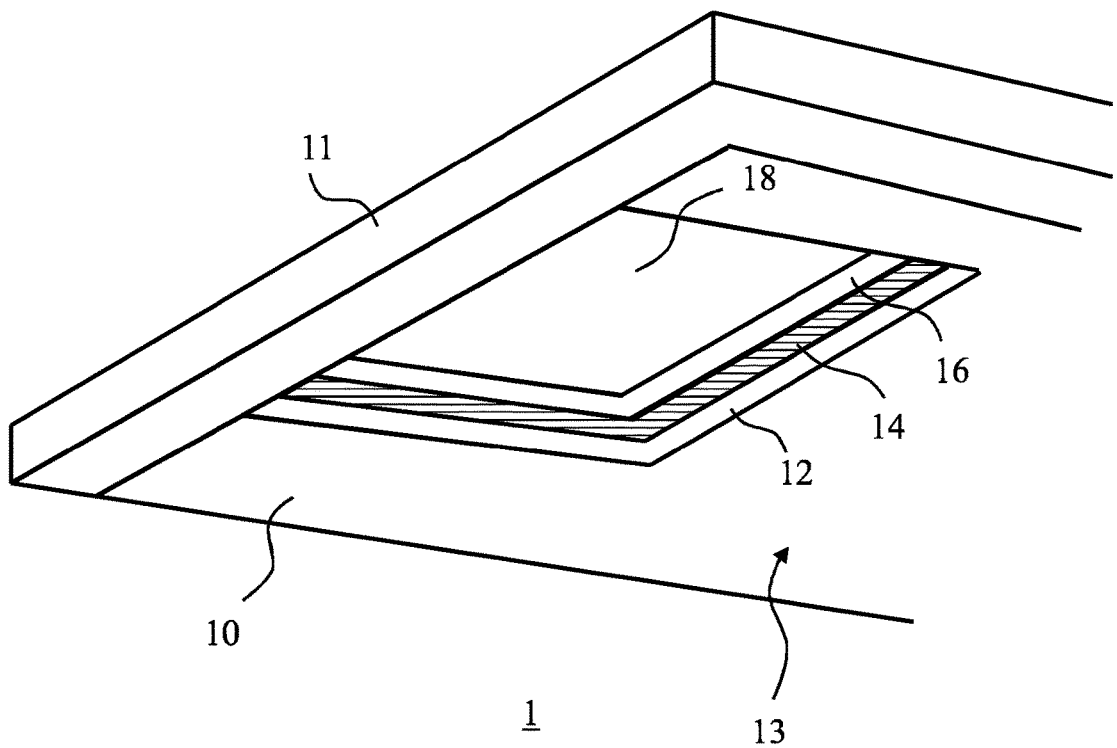
FIG. 1 schematically depicts a perspective view of part of a prior art luminaire.
Figure 2:
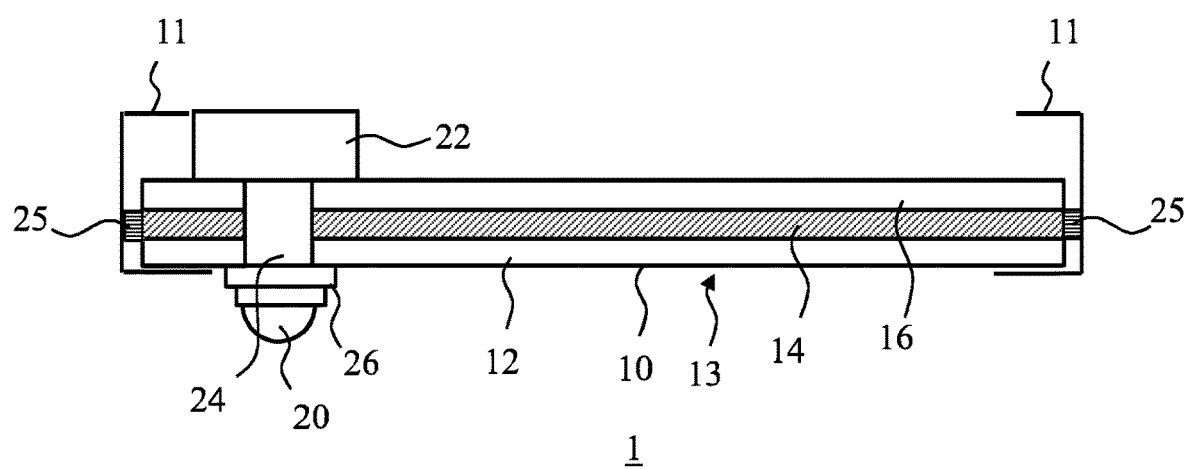
FIG. 2 schematically depicts a cross-sectional view of a prior art luminaire.

It should be understood that the Figures are merely schematic and are not drawn to scale. It should also be understood that the same reference numerals are used throughout the Figures to indicate the same or similar parts.

Figure 3:
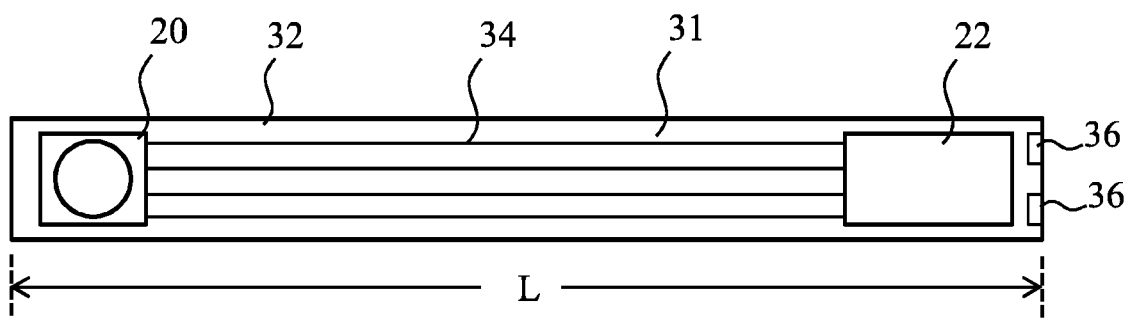
FIG. 3 schematically depicts a face-on view of a sensor strip according to an embodiment.

FIG. 3 schematically depicts a sensor strip 30 according to an embodiment of the present invention. The sensor strip 30 comprises a flexible printed circuit board (PCB) 31. In the context of the present application, a flexible PCB may be any flexible structure embedding one or more conductive tracks 34. For example, the flexible PCB may comprise a laminate of a pair of electrically insulating polymer layers in between such electrically conductive tracks 34 are positioned. Alternatively, the flexible PCB 31 may be made using photolithographic technology. Such techniques are well-known per se and are therefore not explained in further detail for the sake of brevity only. Suitable electrically insulating polymers include polyimide, PEEK, polyester, silicone, PET, and so on. Suitable electrically conductive materials for forming the conductive tracks 34 include copper, aluminum, silver, gold, suitable metal alloys, and so on. The choice of materials for the flexible PCB 31 is not particularly critical such that any suitable material may be used.

The flexible PCB 31 typically has a flat structure with a thickness T not exceeding 1.0 mm, preferably not exceeding 0.5 mm, and further preferably not exceeding 0.2 mm. This ensures that the flexible PCB 31 has the desired flexibility. For example, the sensor strip 30 may take the shape of a ribbon or the like. Consequently, the flexible PCB 31 has opposing major surfaces 32 and 33. The sensor strip 30 further comprises a sensor 20 for controlling the operation of a luminaire. In an embodiment, the sensor 20 is a motion sensor such as a passive infrared (PIR) sensor or any other suitable type of motion sensor. Alternatively, the sensor 20 may be an ambient light sensor, an image sensor such as a CMOS or CCD sensor or any other suitable type of sensor that can be used to control the operation of a luminaire. The sensor strip 30 further comprises a driver 22 for driving the sensor 20. The driver 22 and the sensor 20 both are mounted on one of the major surfaces 32, 33 of the flexible PCB 31 such that the driver 22 is conductively coupled to the sensor 20 through at least one of the conductive tracks 34. The driver 22 is responsive to the sensor 20 such that upon detection of a trigger with the sensor 20 causing the generation of an electrical signal by the sensor 20 that is transmitted to the driver 22 over at least one of the conductive tracks 34 interconnecting the driver 22 to the sensor 20, the driver 22 is triggered by this electrical signal to generate a control signal for a further driver of the one or more light sources of the luminaire 10 such as to switch on the one or more light sources. The sensor trigger may be motion in case of the sensor 20 being a motion sensor or an image sensor, or may be a light level in case of an ambient light sensor. Other suitable sensor triggers will be apparent to the skilled person.

The sensor 20 and the driver 22 are typically mounted at opposing ends of the sensor strip 30. In other words, the sensor 20 is typically mounted on a first section of the flexible PCB 31 and the driver 22 is typically mounted on a second section of the flexible PCB 31, with the first section and the second section being separated by an intermediate section of the flexible PCB 31. The sensor strip 30 has a total length L, and the sensor 20 and the driver 22 are separated by a distance of at least ½ *L. This ensures that a substantial portion, i.e. the intermediate section, of the flexible PCB 31 may be bent (flexed) whilst the respective first and second sections of the flexible PCB 31 are typically mounted on a mounting surface as will be explained in further detail below. However, it should be understood that where reference is made to the sensor 20 and the driver 22 to be mounted at opposing ends of the sensor strip 30, this does not mean that the sensor 20 or the driver 22 have to be mounted against an edge of the sensor strip 30. For example, the flexible PCB 31 of the sensor strip 30 may carry additional structures, such as for example one or more contacts 36, which may be located in between one of the sensor 20 and the driver 22 and a proximal edge of the sensor strip 30. Of course, the sensor strip 30 may carry further electrical components, e.g. electrical components required for the operation of a luminaire for which the sensor strip 30 is to be used.

Figure 4:
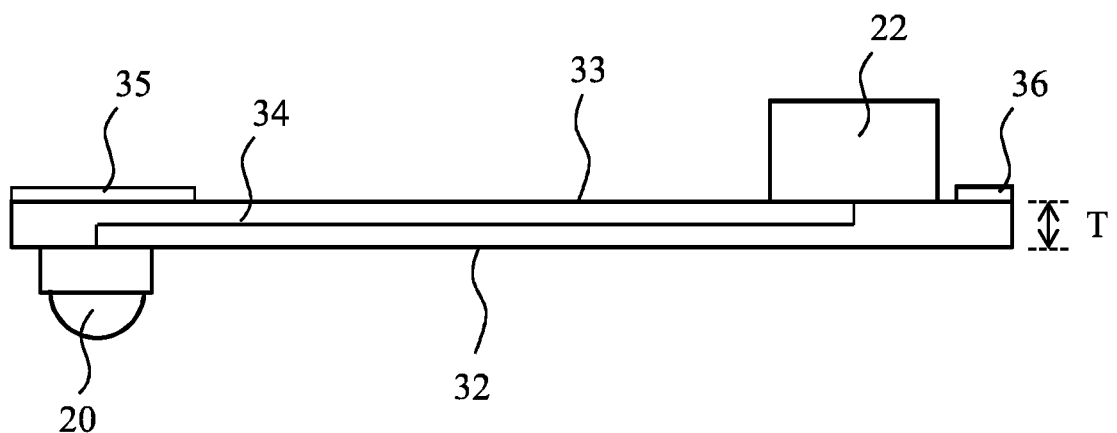
FIG. 4 schematically depicts a cross-sectional view of a sensor strip according to another embodiment.

In FIG. 3, both the sensor 20 and the driver 22 are mounted on the same major surface 32 of the flexible PCB 31. This arrangement for example is suitable for use in a scenario in which the sensor strip 30 is to be wrapped around an edge of a luminaire and the sensor 20 and the driver 22 are to be attached to opposing major surfaces of the luminaire, i.e. the sensor strip is to adopt a U-shape. In FIG. 4, which schematically depicts a cross-sectional view of a sensor strip 30 according to an alternative embodiment, the sensor 20 is mounted on a first major surface 32 of the sensor strip 30 and the driver 22 is mounted on the opposing second major surface 33 of the sensor strip 30. This arrangement for example is suitable for use in a scenario in which the sensor strip 30 is to be wrapped around an edge of the luminaire and a further edge, i.e. the sensor strip 30 is to adopt an S-shape.

The foregoing embodiments of the sensor strip 30 may further comprise a metal backing member 35 on a major surface of the flexible PCB 31 opposing the sensor 20 in order to enhance the mechanical strength or rigidity of the strip at the location of the sensor 20, e.g. to facilitate the mounting of the sensor 20 on a receiving surface. The metal backing member 35 may be a metal sheet or the like that may be attached to the backside of the flexible PCB 31 in any suitable manner, e.g. using a holt-melt adhesive or the like. The metal used for the metal backing member 35 preferably has favorable thermal conductivity properties to dissipate any heat generated by the sensor 20, such as aluminum or the like. A further metal backing member (not shown) may be laminated to the major surface of the flexible PCB 31 opposing the driver 22.

Figure 5:
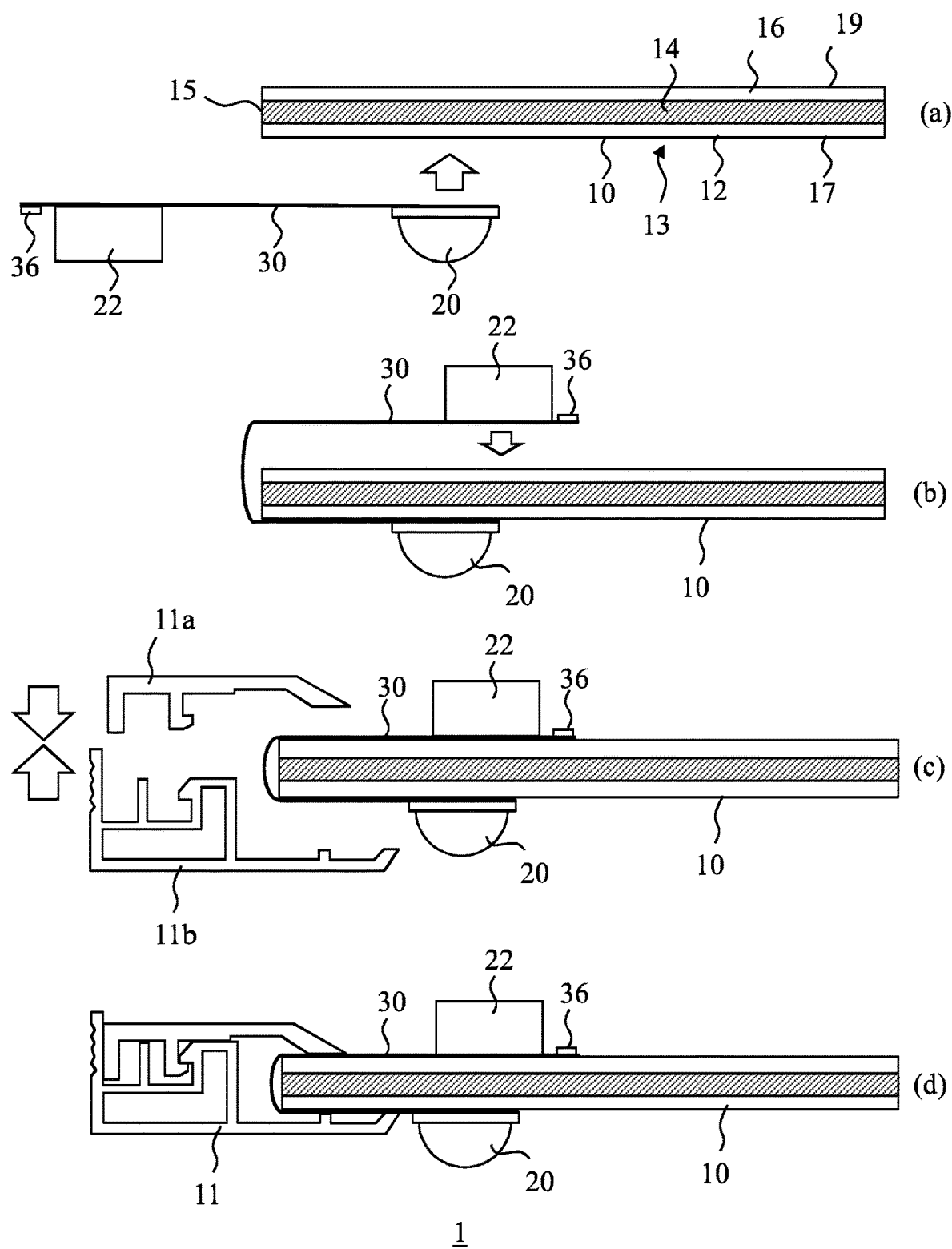
FIG. 5 schematically depicts a cross-sectional view of an assembly method of a luminaire from a luminaire kit according to an example embodiment.

FIG. 5 schematically depicts an assembly method of a luminaire 1 using a luminaire assembly kit including the sensor strip 30 according to an embodiment of the present invention. The luminaire assembly kit further comprises a light transmissive body such as a light panel 10 having opposing major panel surfaces 17, 19 and an edge arrangement including at least one edge 15 extending between the opposing major panel surfaces 17, 19. For example, where the light panel 10 has a circular shape, the edge arrangement comprises a single continuous edge 15, whereas for a light panel 10 having a polygonal shape such as a rectangular shape, the edge arrangement typically comprises a plurality of edges 15, with each edge further extending between a pair of neighboring corners of the polygonal shape. The light panel 10 typically comprises a light guide 14. The light guide 14 is adapted to guide light coupled into the light guide 14 via one of the edges 15 of the edge arrangement through the light guide 14 by means of total internal reflection, with a pattern of light outcoupling structures typically provided on or in the light guide 14 to disrupt such total internal reflection and cause light to escape from the light guide 14 through one of its major surfaces (the light exit surface of the light guide 14). As the operating principle of such light guides is well-known per se, this will not be explained in further detail for the sake of brevity only. The light guide 14 may be made of any suitable material, e.g. an optical grade polymer such as polycarbonate, PMMA, PET and so on, or glass. The light panel 10 may have a laminated structure in which the light guide 14 layer is sandwiched in between a diffuser 12 layer and a reflector 16 layer. The diffuser 12, which may act as the light exit window 13 of the luminaire 1, ensures that light exiting the light guide layer 14 is further diffused, e.g. to tune the optical performance of the luminaire 1, whereas the reflector 16 ensures that light escaping from the light guide 14 through its major surface opposing its intended light exit surface is reflected back into the light guide 14, thereby reducing light losses from the luminaire 1. The diffuser 12 and reflector 16 may take any suitable shape. For example, the reflector 16 layer may be a foil or the like, or may be a reflective coating coated onto the light guide 14. Many other suitable implementations will be immediately apparent to the skilled person.

The luminaire assembly kit further comprises a frame 11 for clamping the light panel 10. Such a frame 11 is typically arranged around the edge arrangement, e.g. the one or more edges 15, of the assembled luminaire 1, and may be made of any suitable material, e.g. a metal, metal alloy, composite material, polymer and so on. The frame 11 may consist of a pair of frame elements 11a, 11b that may be designed to cooperate with each other, e.g. by clicking them together or the like, in order to form the frame 11. The frame 11 is typically dimensioned such that when the frame is positioned around the edge arrangement of the luminaire 1, at least a section of the frame can house the intermediate section of the sensor strip 30 as this is wrapped around an edge 15 of the light panel 10. In other words, the frame 11 has at least a section that snugly fits around an edge 15 with the sensor strip 30 in situ around this edge. This may require aligning the sensor strip 30 with this section of the frame 11. Alternatively, where the sensor strip 30 is thin enough, the sensor strip 30 may be clamped in between the frame 11 and the edge 15 without the frame 11 requiring a dedicated section for receiving the sensor strip 30.

Although not specifically shown for the sake of clarity only, the luminaire assembly kit may further comprise one or more light sources such as solid state lighting elements, e.g. LEDs, for example for arranging along at least a part of the edge arrangement of the luminaire 1 such that the light output of these light sources can be coupled into the light guide 14 of the light panel 10. Such light sources may be mounted against the edge arrangement in any suitable manner, e.g. on the frame 11 or as a lighting strip or the like attached to the light panel 10. As such edge-lit arrangements are well-known per se, it suffices to state that any suitable arrangement of the one or more light sources along the edge arrangement of the luminaire 1 may be used.

At this point it is noted that although in preferred embodiments the luminaire 1 comprises a light panel 10, embodiments of the present invention are not limited thereto. The teachings of the present invention may be deployed for any type of luminaire having light transmissive body comprising a light exit window 13 clamped in a frame 11, such as downlighting luminaires or the like. In such luminaire, the one or more light sources 25 may be positioned in any suitable location within the luminaire 1, such that the luminous output of such one or more light sources 25 is directly or indirectly incident on the light exit window 13. For example, the light transmissive body may comprise a light entry surface opposing a light exit surface, in which case the one or more light sources of the luminaire 10 are arranged proximal to the light entry surface. Such a light transmissive body preferably is translucent or diffusely transparent such as to obscure the one or more light sources (and the driver 22) from direct view.

In step (a) of the luminaire assembly method, in which the luminaire 1 comprises a light panel 10 by way of non-limiting example, the section of the sensor strip 30 carrying the sensor 20 is attached to the major panel surface 17 of the light panel 10 acting as the light exit surface of the luminaire 1. For example, this section of the sensor strip 30 may be adhered to the major panel surface 17 using an adhesive or double-sided adhesive tape. The sensor 20 may be positioned such that upon assembly of the luminaire 1, the sensor 20 sits flush against the frame 11 around the edge arrangement including the edge 15 of the luminaire 1.

Next, as shown in step (b), the intermediate section of the sensor strip 30 (i.e. the flexible PCB 31) is wrapped around the edge 15 of the light panel 10 and the section of the sensor strip 30 carrying the driver 22 is attached to the opposing major panel surface 19 of the light panel 10. For example, this section of the sensor strip 30 may be adhered to the opposing major panel surface 19 using an adhesive or double-sided adhesive tape. Of course, step (a) and (b) may be interchanged without departing from the teachings of the present invention.

In step (c), the frame 11, here represented by frame elements 11a and 11b, is positioned around the edge arrangement including the edge 15 of the light panel 10. This for example may be achieved by clicking the frame elements 11a and 11b together, thereby forming the frame 11 clamping or otherwise securing the light panel 10 such that the intermediate section of the sensor strip 30 in between the section of the sensor strip 30 carrying the sensor 20 and the section of the sensor strip 30 carrying the driver 22 that is wrapped around the edge 15 is clamped in between the frame 11 and the light panel 10, thus leading to the assembled luminaire 1 as shown in step (d).

Figure 6:
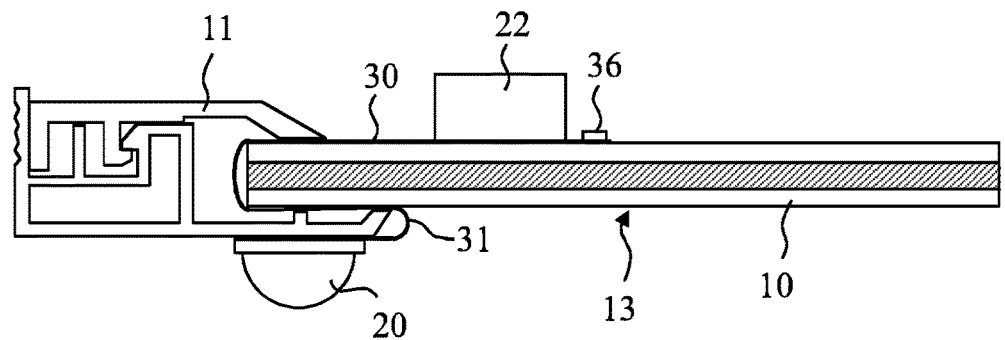
FIG. 6 schematically depicts a cross-sectional view of an assembled luminaire according to an alternative embodiment.

Of course, many variations to this assembly method will be immediately apparent to the skilled person. For example, the section of the sensor strip 30 carrying the sensor 20 and/or the section of the sensor strip 30 carrying the driver 22 does not necessarily need to be attached to the light panel 10 prior to positioning the frame 11 around the edge arrangement including the edge 15 of the light panel 10, as such sections equally may be attached after the frame 11 has been positioned around this edge arrangement. Moreover, as has been previously explained, the section of the sensor strip 30 carrying the sensor 20 does not necessarily need to be secured against the light panel 10 (or more generally, the light exit window 13). For instance, FIG. 6 schematically depicts a cross-sectional view of a luminaire 1 in which the section of the sensor strip 30 carrying the sensor 20 has been secured against an exposed surface portion of the frame 11 such that the sensor 20 may sense within a space in which the luminaire 1 has been installed without reducing the effective area of the light exit surface of the luminaire 1.

Figure 7:
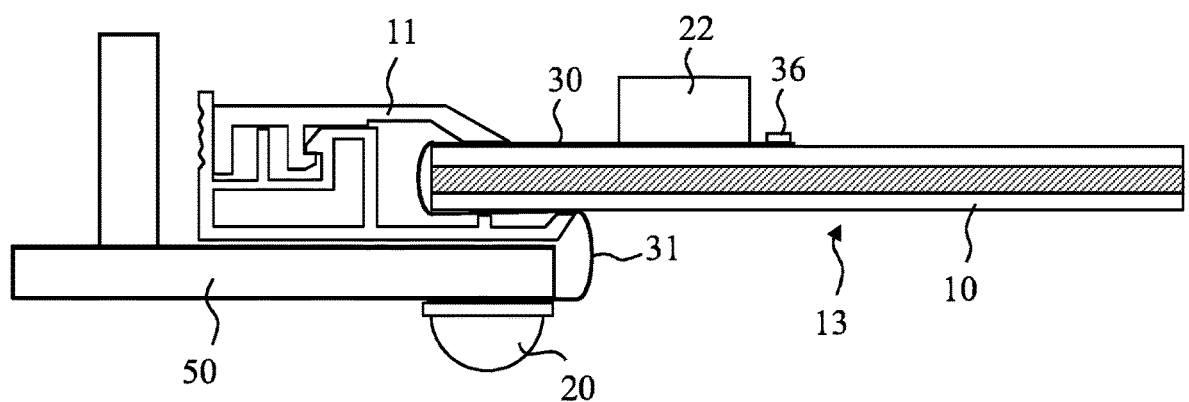
FIG. 7 schematically depicts a cross-sectional view of a luminaire installation according to an embodiment.

However, in some installations of the luminaire 1, the frame 11 of the luminaire 1 may not be exposed, e.g. for aesthetic reasons. This for example may be the case in a scenario in which the luminaire 1 is installed in a support frame 50, such as schematically depicted in FIG. 7. In such a scenario, the section of the sensor strip 30 carrying the sensor 20 may be attached to an exposed surface section of the support frame 50 instead. Such a support frame 50 for example may form part of a surface installation such as a suspended ceiling, in which surface tiles are supported by the support frame 50, e.g. a T-bar or the like. The luminaire 1 may be dimensioned to fit without a recess of the support frame 50 as will be readily understood by the skilled person. In such a luminaire installation, the section of the sensor strip 30 carrying the motion sensor 20 may be left unattached during the assembly of the luminaire 1 in accordance with the aforementioned assembly method, such that upon installation of the luminaire 1 in the support frame 50 the section of the sensor strip 30 carrying the sensor 20 may be attached to the support frame 50, e.g. using an adhesive or double-sided tape. Hence, the provision of the sensor 20 and driver 22 of the luminaire 1 on a flexible sensor strip 30 facilitates the installation of the sensor 20 on a range of different surfaces without having to open up the light panel 10 of the luminaire 1. This therefore facilitates a cost-effective and easy way to effectively extend the functionality of such a luminaire 1 with sensor functionality such as motion or light sensitivity.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A luminaire assembly kit comprising: a light transmissive body, a frame comprising at least one frame element for fitting around an edge of the light transmissive body and a sensor strip, the sensor strip comprising:
   a flexible printed circuit board having opposing major surfaces and a plurality of conductive tracks embedded in the flexible printed circuit board;
   a sensor; and
   a driver for said sensor, wherein the sensor and the driver are conductively coupled to each other through at least some of said conductive tracks and are mounted on one of said major surfaces at opposing ends of the flexible printed circuit board;
   wherein the frame is dimensioned such that the frame fits around said edge with a section of the flexible printed circuit board wrapped around said edge in between the light transmissive body and the frame.

2. The luminaire assembly kit of claim 1, wherein the sensor and the driver are mounted on the same major surface of the flexible printed circuit board, or, the sensor and the driver are mounted on opposing major surfaces of the flexible printed circuit board.

3. The luminaire assembly kit of claim 1, wherein the sensor is a motion sensor or an ambient light sensor.

4. The luminaire assembly kit of claim 1, wherein the flexible printed circuit board has a thickness not exceeding 0.5 mm and/or wherein the flexible printed circuit board has a length of at least 50 mm.

5. The luminaire assembly kit of claim 1, wherein the light transmissive body comprises a light panel, optionally wherein the light panel is a laminate panel comprising a light guide layer in between a reflector layer and a diffuser layer.

6. A method of assembling a luminaire from the luminaire assembly kit of claim 5, the method comprising:
   attaching a first section of the flexible printed circuit board carrying the driver to a major panel surface of the light panel opposing a light exit surface of the light panel;
   wrapping an intermediate section of the flexible printed circuit board in between the first section and a second section carrying the sensor around an edge of the light panel; and
   clamping the light panel in the frame such that the intermediate section of the flexible printed circuit board is located in between said edge and the frame.

7. The method of claim 6, further comprising attaching the second section of the flexible printed circuit board to the light exit surface of the light panel.

8. The luminaire assembly kit of claim 1, further comprising at least one light source.

9. A luminaire comprising:
   a light transmissive body;
   a frame arranged around at least one edge of the light transmissive body;
   at least one light source arranged to generate a luminous output through the light transmissive body; and
   a sensor strip comprising:
      a flexible printed circuit board having opposing major surfaces and a plurality of conductive tracks embedded in the flexible printed circuit board;
      a sensor; and
      a driver for said sensor, wherein the sensor and the driver are conductively coupled to each other through at least some of said conductive tracks and are mounted on one of said major surfaces at opposing ends of the flexible printed circuit board;
   wherein:
      a first section of the flexible printed circuit board carrying the driver is hidden from view, behind the light transmissive body;
      an intermediate section of the flexible printed circuit board in between the first section and a second section carrying the sensor is wrapped around an edge of the at least one edge of the light transmissive body such that this intermediate section is located in between the frame and the light transmissive body; and
      the second section carrying the sensor extends beyond the frame in front of the light transmissive body.

10. The luminaire of claim 9, wherein the sensor and the driver are mounted on the same major surface of the flexible printed circuit board, or, the sensor and the driver are mounted on opposing major surfaces of the flexible printed circuit board.

11. The luminaire of claim 9, wherein the sensor is a motion sensor or an ambient light sensor, and wherein the flexible printed circuit board has a thickness not exceeding 0.5 mm and/or wherein the flexible printed circuit board has a length of at least 50 mm.

12. The luminaire of claim 9, wherein the light transmissive body comprises a light panel having a first major panel surface acting as a light exit window, a second major panel surface opposing the first major panel surface and said at least one edge extending from the first major panel surface to the second major panel surface; wherein:
   the frame is arranged to secure the light panel;
   the at least one light source is arranged to inject its luminous output into the light panel via an edge of the at least one edge; and
   the first section of the flexible printed circuit board carrying the driver is attached to the second major panel surface.

13. The luminaire of claim 12, wherein the second section of the flexible printed circuit board carrying the sensor is attached to the first major panel surface or the frame.

14. The luminaire of claim 9, wherein the first section and/or the second section of the flexible printed circuit board are attached with double-sided adhesive tape.

15. A luminaire installation comprising the luminaire of claim 9 mounted in a support frame attached to an installation surface, wherein the second section of the flexible printed circuit board carrying the sensor is attached to the support frame.

* * * * *